US011355336B2

(12) United States Patent
Ievlev et al.

(10) Patent No.: US 11,355,336 B2
(45) Date of Patent: Jun. 7, 2022

(54) TIME-RESOLVED CHEMICAL STUDIES VIA TIME-OF-FLIGHT SECONDARY ION MASS SPECTROMETRY

(71) Applicants: UT-BATTELLE, LLC, Oak Ridge, PA (US); University of Tennessee Research Foundation, Knoxville, TN (US)

(72) Inventors: Anton V. Ievlev, Knoxville, TN (US); Olga S. Ovchinnikova, Knoxville, TN (US); Matthias Lorenz, Toronto (CA); Yongtao Liu, Knoxville, TN (US)

(73) Assignees: UT-BATTELLE, LLC, Oak Ridge, TN (US); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 0 days.

(21) Appl. No.: 17/174,968

(22) Filed: Feb. 12, 2021

(65) Prior Publication Data

US 2021/0257205 A1    Aug. 19, 2021

Related U.S. Application Data

(60) Provisional application No. 62/976,488, filed on Feb. 14, 2020.

(51) Int. Cl.
*H01J 49/40* (2006.01)
*H01J 49/00* (2006.01)
*H01J 49/02* (2006.01)

(52) U.S. Cl.
CPC ........ *H01J 49/408* (2013.01); *H01J 49/0031* (2013.01); *H01J 49/022* (2013.01)

(58) Field of Classification Search
CPC ..... H01J 49/408; H01J 49/0031; H01J 49/022
USPC .......................... 250/281, 282, 283, 286, 287
See application file for complete search history.

(56) References Cited

U.S. PATENT DOCUMENTS

| 4,829,178 | A | 5/1989 | Waugh | |
|---|---|---|---|---|
| 2004/0183007 | A1* | 9/2004 | Belov | H01J 49/401 250/282 |
| 2008/0078928 | A1 | 4/2008 | Wang et al. | |
| 2010/0123073 | A1* | 5/2010 | Guest | H01J 49/005 250/281 |
| 2013/0264473 | A1* | 10/2013 | Makarov | H01J 49/4245 250/282 |

(Continued)

OTHER PUBLICATIONS

Liu, Y. et al. Hysteretic Ion Migration and Remanent Field in Metal Halide Perovskites. Advanced Science 7,2001176 (2020).

(Continued)

*Primary Examiner* — Nicole M Ippolito
(74) *Attorney, Agent, or Firm* — Fox Rothschild LLP

(57) ABSTRACT

A method of performing time-of-flight secondary ion mass spectrometry on a sample includes the step of directing a beam of primary ions to the sample, and stimulating the migration of ions within the sample while the beam of primary ions is directed at the sample. The stimulation of the ions is cycled between a stimulation state and a lower stimulation state. Secondary ions emitted from the sample by the beam of primary ions are collected in a time-of-flight mass spectrometer. Time-of-flight secondary ion mass spectrometry is then performed on the secondary ions. A system for performing time-of-flight secondary ion mass spectrometry on a sample is also disclosed.

16 Claims, 15 Drawing Sheets

(56) References Cited

U.S. PATENT DOCUMENTS

2013/0270432 A1  10/2013  Iwasaki
2014/0203707 A1   7/2014  King et al.
2015/0287578 A1  10/2015  Bendall et al.

OTHER PUBLICATIONS

Liu. Y., Borodinov N., Collins L., Ahmadi M., Kalinin S.V., Ovchinnikova O.S., Ievlev A.V., Role of Decomposition Product Ions in Hysteric Behavior of Metal Halide Perovskite, (submitted).
Higgins, K. et al. Exploration of Electrochemical Reactions at Organic-Inorganic Halide Perovskite Interfaces via Machine Learning in In Situ Time?of?Flight Secondary Ion Mass Spectrometry. Advanced Functional Materials 30, 2001995 (2020).
Liu. Y., Ievlev A.V , Borodinov N., Lorenz M., Xiao K , Ahmadi M , Kalinin S.V., Ovchinnikova O S , Direct Observation of Photoinduced Ion Migration in Lead Halide Perovskites, Advanced Functional Materials, 2008777, (2020).
Liu, Y. et al. Strain-Chemical Gradient and Polarization in Metal Halide Perovskites Advanced Electronic Materials 6, 1901235 (2020).
Ahmadi, M. et al. Spatially Resolved Carrier Dynamics at MAPbBr3 Single Crystal-Electrode Interface. ACS applied materials & interfaces 11, 41551-41560 (2019).

* cited by examiner

FIG. 14A  FIG. 14B

TIME-RESOLVED CHEMICAL STUDIES VIA TIME-OF-FLIGHT SECONDARY ION MASS SPECTROMETRY

CROSS-REFERENCE TO RELATED APPLICATIONS

This application claims priority to U.S. Provisional Patent Application No. 62/976,488 filed on Feb. 14, 2020, entitled "Time-Resolved Chemical Studies via Time-of-Flight Secondary Ion Mass Spectrometry", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to mass spectrometry, and more particularly to time-of-flight secondary ion mass spectrometry.

BACKGROUND OF THE INVENTION

Time-of-Flight Secondary Ion Mass Spectrometry (ToF-SIMS) is an analytical method allowing local characterization of the chemical composition of a wide range of materials and systems. It utilizes a primary ion beam focused on the surface of the studied sample to generate and extract secondary analyte ions, which are further analyzed using a time-of-flight mass analyzer. The properties of the primary ion beam used for secondary ions extraction define the lateral and depth resolution of the chemical characterization. In certain cases sub-100-nm lateral and sub-nanometer depth resolutions can be achieved in commercial ToF-SIMS instruments. Analysis of secondary ions is performed using time-of-flight mass analyzers, in which ions are accelerated in the external electric field and move towards a detector. By the time-of-flight from the sample to the detector, the mass-to-charge ratio of secondary ions can be acquired. This measurement scheme allows parallel identification of all extracted ions of the same polarity within a defined mass range, limited by the waiting time. Identification mass resolution m/$\Delta$m can reach up to 30,000 in certain measurement modes.

ToF-SIMS allows precise chemical characterization of the variety of materials and systems with high spatial and mass resolution. It is widely used in chemistry, material sciences and biology to study local chemical phenomena. However, to date ToF-SIMS applications are mostly limited to the investigation of static phenomena, where chemical composition is considered unchanged during the measurement.

SUMMARY OF THE INVENTION

A method of performing time-of-flight secondary ion mass spectrometry on a sample, includes the steps of directing a beam of primary ions to the sample, stimulating the migration of ions within the sample while the beam of primary ions is directed at the sample, cycling the stimulation of the ions between a stimulation state and a lower stimulation state, collecting secondary ions emitted from the sample by the beam of primary ions in a time-of-flight mass spectrometer, and performing time-of-flight secondary ion mass spectrometry on the secondary ions.

Any suitable stimulus can be used to create movement of the ions within the sample. The stimulation of the ions within the sample can be the application of an electric field across the sample. The stimulation of the ions within the sample can include changing the temperature of the sample. The stimulation of the ions within the sample can include irradiating the sample with electromagnetic radiation. The electromagnetic radiation can be a laser beam. The electromagnetic radiation can be broad spectrum white light. The stimulation of the ions within the sample can include the application of mechanical force to the sample. The stimulation of the ions within the sample can include the application to the sample of a chemical species that causes ion migration within the sample. Combinations of different forms of stimulus can be utilized.

The method can include the step of collecting stimulation response data. The beam of primary ions can be moved across portions the sample. The position where the primary ion beam intercepts the sample can be controlled by a processor. The processor can store position data comprising the position where the beam intercepts the sample. The processor can store time-of flight secondary ion mass spectrometry data and correlates such data with the primary ion beam position data. The processor can store the position data and the time-of-flight secondary ion mass spectrometry data as a function of time.

The primary ions can be any suitable primary ions. The primary ions can include at least one selected from the group consisting of Bi, Ar, Au, Ga and $C_{60}$.

The sample can be any suitable sample. The sample, for example, can be at least one selected from the group consisting of ferroelectrics, memristors, photovoltaics and catalytic materials.

A system for performing time-of-flight secondary ion mass spectrometry on a sample can include a primary ion generator for directing a beam of primary ions to the sample. An ion migration stimulator can be provided for selectively causing ion migration within the sample. A collector receives collected secondary ions emitted from the sample, and directs the collected secondary ions to a mass spectrometer. A time-of-flight mass spectrometer performs time-of-flight secondary ion mass spectrometry on the collected secondary ions.

The ion migration stimulator can include an electrical field source for applying an electrical field to the sample. The ion migration stimulator can include a heater/cooler for changing the temperature of the sample. The ion migration stimulator can include a source of electromagnetic radiation. The source of electromagnetic radiation can in one embodiment generate a laser beam. The source of electromagnetic radiation in another embodiment generates broad spectrum white light. The ion migration stimulator can be a mechanical force applicator for applying a mechanical force to the sample. The ion migration stimulator can include a source of a chemical species that causes ion migration within the sample.

The primary ion generator can include a focusing system for focusing the beam of primary ions to selected locations of the sample. The system can further include a processor for controlling the focusing system and the position where the primary ion beam intercepts the sample. The processor can store position data including the position where the primary ion beam intercepts the sample. The processor can store time-of flight secondary ion mass spectrometry data and correlates such data with the primary ion beam position data. The processor can store the primary ion beam position data and the time-of-flight secondary ion mass spectrometry data as a function of time. The system can further include a stimulation response sensing device.

BRIEF DESCRIPTION OF THE DRAWINGS

There are shown in the drawings embodiments that are presently preferred it being understood that the invention is not limited to the arrangements and instrumentalities shown, wherein:

FIG. 12(a) shows the applied electrical bias, and FIG. 12(b) is a time evolution map of HOIP decomposition ions.

FIG. 13(a-b) shows charge carrier transport between lateral electrodes on the surface of HOIP thin film, where

FIG. 14 (a-f) shows time-resolved ToF-SIMS investigations of polymer coating melting and crystallization, where: FIG. 14(a) shows morphological changes acquired using secondary electron signal for a sprayed sample; FIG. 14 (b) shows morphological changes acquired using secondary electron signal for a melting sample at 400° C.

DETAILED DESCRIPTION OF THE INVENTION

Figure 1:
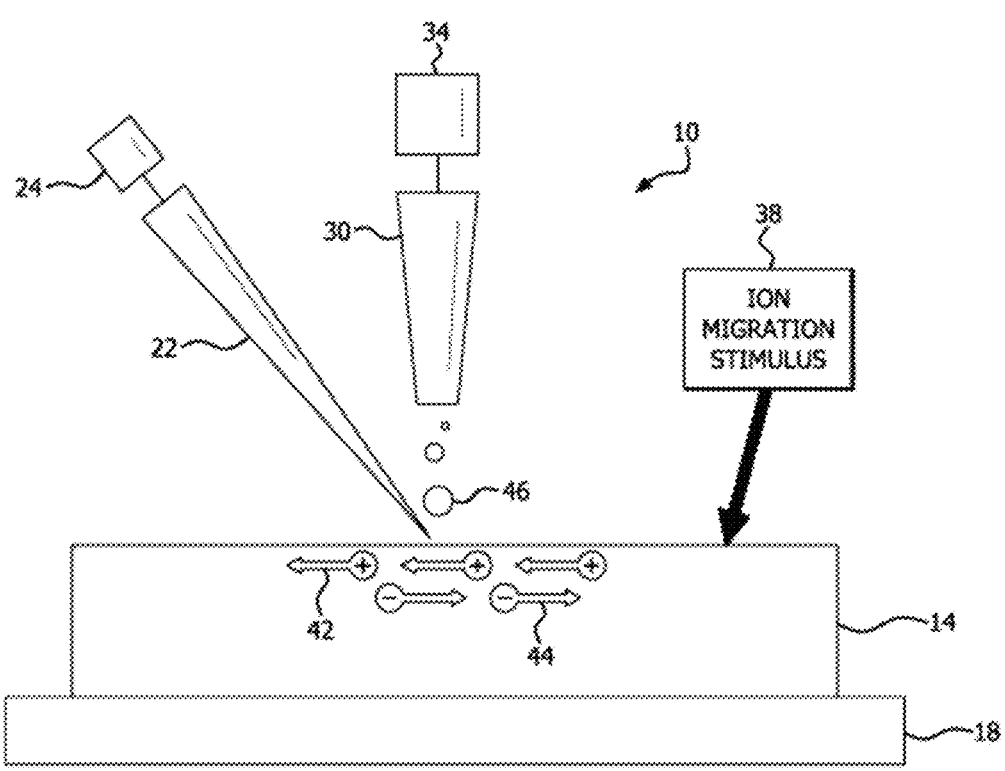
FIG. 1 is a schematic depiction of a secondary ion time-of-flight mass spectrometry system with ion migration stimulus.

A system and method of performing time-of-flight secondary ion mass spectrometry on a sample includes the step of directing a beam of primary ions to the sample, and stimulating the migration of ions within the sample while the beam of primary ions is directed at the sample. The kind of stimulus that can be used can vary, depending on the characteristics of the sample material being evaluated. The stimulus should be sufficient to generate movement of ions within the sample. The stimulation of the ions is cycled between a stimulation state and a lower stimulation state. The lower stimulation state can be the absence of any stimulation, or stimulation that is reduced from that of the stimulation state. Secondary ions emitted from the sample by the beam of primary ions are analyzed by a time-of-flight mass spectrometer. Time-of-flight secondary ion mass spectrometry is then performed on the secondary ions.

The system and method can further include a stimulus response sensing device and the step of collecting stimulation response data. The type of stimulation response sensing device that is used and stimulus response sensing data that is collected will depend on the nature of the stimulation that is applied to the sample.

The ion migration stimulator and stimulus can comprises an electric field source for applying an electrical field to the sample. The ion migration stimulator can apply a voltage across the electrodes of −100-100 V. The potential can be time-varying, and can have a frequency range from DC to 100 Hz. The electrical field stimulation response sensing device can measure different characteristics of the applied electrical field, such as electric current, surface potential difference or potential drop.

The ion migration stimulation and ion migration stimulator can comprise a source of electromagnetic radiation. Various kinds of electromagnetic radiation can be applied to the sample, and the particular characteristics of the radiation should be suitable for the sample. The electromagnetic radiation stimulation response sensing device can detect different characteristics of the system, for example the transmittance or reflectance of the irradiated light.

The source of electromagnetic radiation can be a laser. The laser can have any suitable wavelength, frequency and intensity. The laser beam stimulation response sensing device can sense different characteristics of the sample, for example the absorption, transmittance or reflectance of the laser beam by the sample.

The source of electromagnetic radiation can be a source of broad spectrum white light. The intensity of the broad spectrum white light can be any suitable intensity. The broad spectrum white light can be pulsed, and the pulses can have any suitable frequency. The broad spectrum white light stimulation response sensing device can sense different characteristics of the sample, for example the transmittance, absorption or reflectance of the broad spectrum white light by the sample.

The ion migration stimulator comprises a heater/cooler for changing the temperature of the sample. Temperature change is known to affect the composition, structure, and ionic characteristics of many materials. These include broad range of functional materials, polymers and soft matter. The temperature change stimulation response sensing device can sense different characteristics of the sample, for example temperature gradient or heating/cooling rate.

The ion migration stimulator can be a mechanical force applicator for applying a mechanical force to the sample. The application of a mechanical force is known to produce ionic movement within a sample material. One of the examples of such behavior is the piezoelectric effect. The mechanical force stimulation response sensing device can sense different characteristic of the sample, for example the sample deformation under the applied mechanical force. The applied force can also be compressive, tensile or shear.

The ion migration stimulator comprises a source of a chemical species that causes ion migration within the sample. Ion species can be delivered to the studied sample in the gaseous form from atmosphere created in the vacuum chamber of ToF-SIMS. The used gases can contain species of $^{16}O$, $^{18}O$, N or Ar. These species can react with the surface of studied sample and lead to ionic motion or chemical reaction, which leads to change of the material properties. This can be especially important to study properties of catalytic materials, where reactivity of surface plays a crucial role in their application. The chemical ion migration stimulation sensing device can sense many different characteristics of the system such as the concentration of the chemical species, the concentration of reactants, changes in temperature resulting from the reaction, and others.

The beam of primary ions can be moved or rastered across portions the sample. The position where the primary ion beam intercepts the sample can be controlled by a processor. The processor can store position data comprising the position where the beam intercepts the sample. The processor can also store time-of flight secondary ion mass spectrometry data and correlates such data with the primary ion beam position data. The processor can store and analyze the position data and the time-of-flight secondary ion mass spectrometry data as a function of time.

The primary ion beam can comprise structure and primary ions suitable for use with existing secondary ion time-of-flight mass spectrometry methods and systems. Primary ions can without limitation be selected from the group consisting of Bi, Ar, Au, Ga and C60. Other primary ions are possible.

The invention can be utilized with a wide variety of possible sample materials, including many of the sample materials which are currently analyzed by secondary ion time-of-flight mass spectrometry, as well as other sample materials. The invention is an improvement on a basic research tool and as such has wide possible applications. The sample for example, and without limitation, can comprise at least one selected from the group consisting of polymers, ferroelectrics, memristors, photovoltaics, fuel-cell and catalytic materials. Other sample materials are possible.

A system for performing time-of-flight secondary ion mass spectrometry on a sample includes a primary ion generator for directing a beam of primary ions to the sample. An ion migration stimulator is provided for selectively causing ion migration within the sample. A stimulation response sensing device can be provided. The primary ion generator can include a focusing system for focusing the beam of primary ions to selected locations of the sample. A processor can be provided for controlling the focusing system and the position where the primary ion beam intercepts the sample. The processor can store position data comprising the position where the primary ion beam intercepts the sample. The processor can store time-of flight secondary ion mass spectrometry data and correlates such data with the primary ion beam position data. The processor can store the primary ion beam position data and the time-of-flight secondary ion mass spectrometry data as a function of time. A collector receives collected secondary ions emitted from the sample, and directs the collected secondary ions to a mass spectrometer. A time-of-flight mass spectrometer for performing time-of-flight secondary ion mass spectrometry on the collected secondary ions.

There is shown in FIG. 1 a time-of-flight secondary ion mass spectrometry system 10 for analyzing a sample 14 on a sample stage 18. A primary ion beam 22 from a primary ion beam generator 24 is directed at the sample 14. A secondary ion collector 30 and secondary ion time-of-flight mass spectrometer 34 are provided to receive and process secondary ions. An ion migration stimulus source 38 applies an ion migration stimulus to the sample 14. Ions within the sample 14 such as positive ions 42 and negative ions 44 move within the sample 14 under the influence of the ion migration stimulus source 38. The primary ion beam 22 strikes the sample and generates secondary ions 46 from the positive ions 42 and negative ions 44, or from other compounds in the sample 14. These secondary ions 46 are collected by the secondary ion collector 30 and processed by the secondary ion time-of-flight mass spectrometer 34. Information from the secondary ion time-of-flight mass spectrometer 34 can be combined with knowledge of the position of the primary ion beam 22 relative to the sample 14 to provide detailed information regarding the movement of ions within the sample 14.

Figure 2:
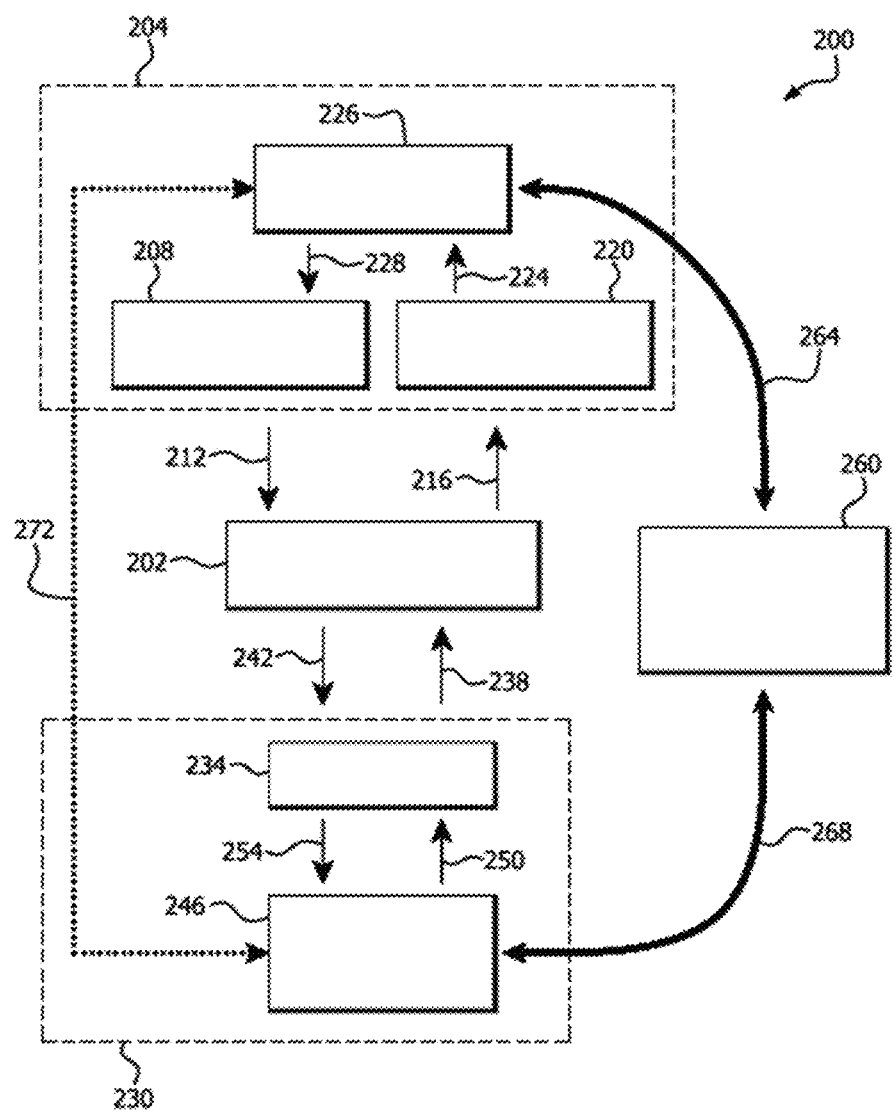
FIG. 2 is a block diagram illustrating a secondary ion time-of-flight mass spectrometry system with ion migration stimulus and stimulus response detection.

There is shown in FIG. 2 a schematic block diagram of a system 200 for performing secondary ion time-of-flight mass spectrometry with ion migration stimulus and stimulus response detection performed on a sample 202. The system 200 includes a time-of-flight secondary ion mass spectrometry instrument 204 comprising a primary ion generator 208 for generating a primary ion beam 212 and delivering this beam to the sample 202. This will generate a flow of secondary ions 216 which are processed by a time-of-flight mass analyzer 220. A communications connection 224 provides this information to the time-of-flight secondary ion mass spectrometer controller 226. Control information can be provided by the time-of-flight secondary ion mass spectrometer controller 226 to the primary ion generator 208 through a suitable communications connection 228.

An ion migration stimulus unit 230 is also provided. The ion migration stimulus unit 230 includes an ion migration stimulus generator 234 for providing an ion migration stimulus 238 to the sample 202. A stimulus response signal 242 can be detected from the sample 202 and returned to the ion migration stimulus unit 230 through an appropriate communications connection. An ion migration stimulus controller 246 can also be provided. The ion migration stimulus controller 246 can send appropriate control signals 250 to the ion migration stimulus generator 234. Ion migration stimulus response signals 254 can be provided to the ion migration stimulus controller 246.

A processor 260 can be provided to control the system 200. Control signals 264 can be sent between the processor 260 and the time-of-flight secondary ion mass spectrometer controller 226. Control signals 268 can be sent between the processor 260 and the ion migration stimulus controller 246. Control and information signals 272 can also be transmitted between the time-of-flight secondary ion mass spectrometer controller 226 and the ion migration stimulus controller 246.

Figure 3:
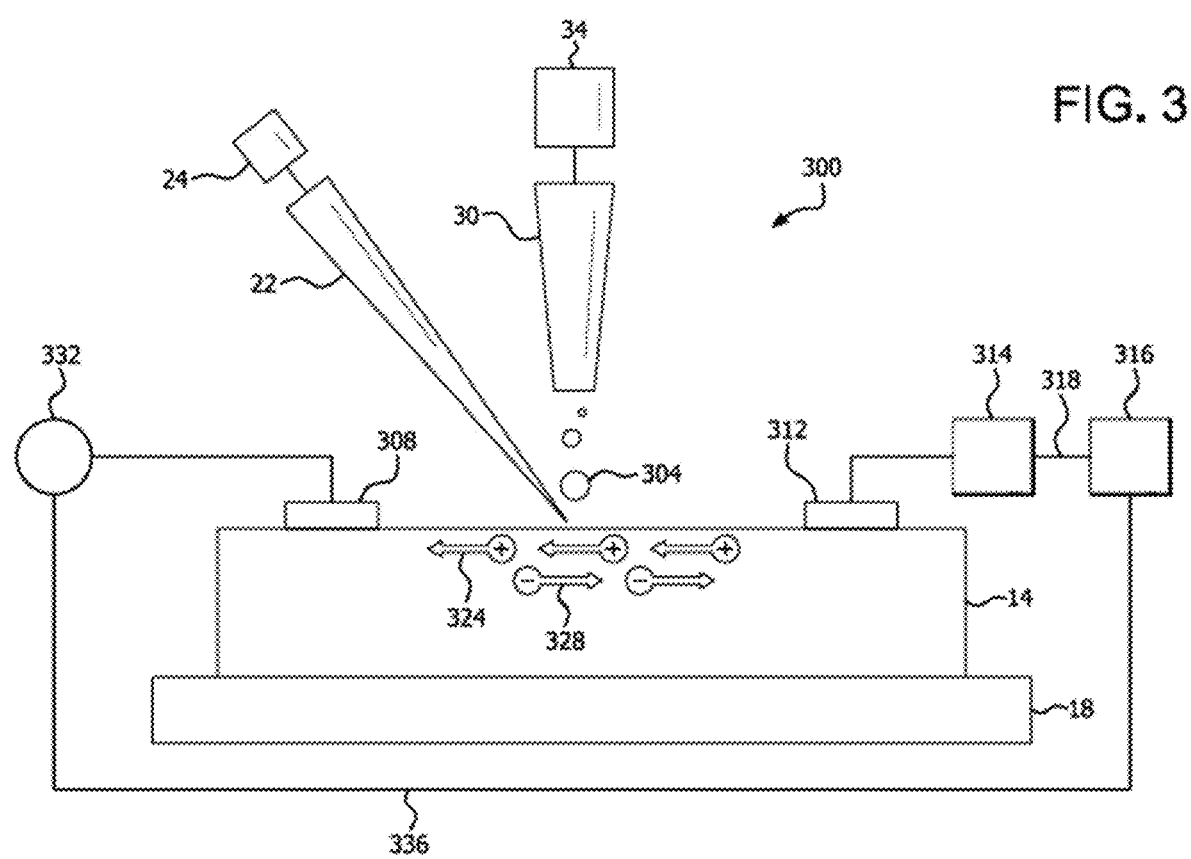
FIG. 3 is a schematic depiction of a secondary ion time-of-flight mass spectrometry system with electrical potential ion migration stimulus.

The stimulation of the ions within the sample can comprise applying an electric field across the sample. There is shown in FIG. 3, where like numbers refer to like elements, a secondary ion time-of-flight mass spectrometry system 300 with an electric field ion migration stimulus. Electrical contacts 308 and 312 are applied to the sample 14. A source of potential 314 is provided so as to create an electrical potential between the contacts 308 and 312. The applied potential can be controlled by a processor 316 through a communications line 318, which can be wired or wireless. The applied potential stimulates ion migration of positive ions 324 and/or negative ions 328 in the sample 14. A sensor 332 can be provided to sense the electrical stimulus response of the sample 14. This stimulus response can be reported to the processor 316 through a communications line 336. Secondary ions 304 are collected by the secondary ion collector 30 and process by the time-of-flight mass spectrometer 34. The processor 316 can control and share data with the primary ion beam generator 24 and the time-of-flight mass spectrometer 34 through suitable communications connections, which can be wired or wireless.

Figure 4:
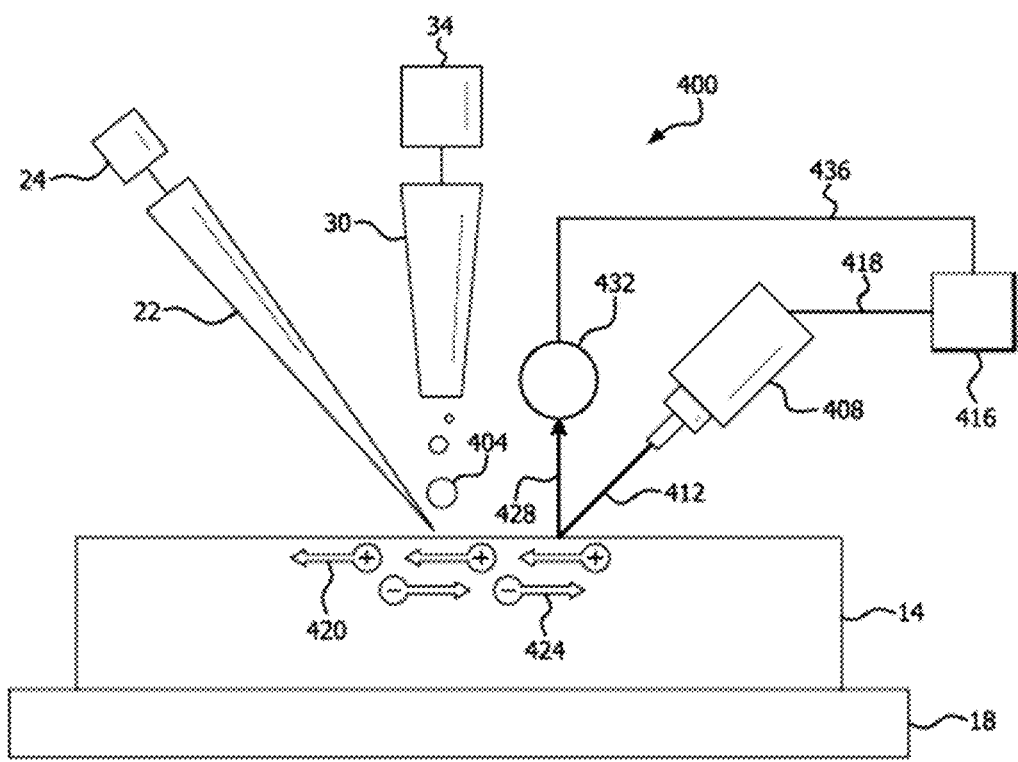
FIG. 4 is a schematic depiction of a secondary ion time-of-flight mass spectrometry system with laser beam ion migration stimulus.

The stimulation of the ions within the sample can comprise irradiating the sample with electromagnetic radiation. The electromagnetic radiation can comprise a laser beam. There is shown in FIG. 4, where like numbers refer to like elements, a secondary ion time-of-flight mass spectrometry system 400 with an laser beam ion migration stimulus. A laser beam generator 408 is provided so as to direct a laser beam 412 to the sample 14. The laser beam generator 408 can be controlled by a processor 416 through a communications line 418, which can be wired or wireless. The laser beam 412 stimulates ion migration of positive ions 420 and/or negative ions 424 in the sample 14. A sensor 432 can be provided to sense the response of the sample 14 to the laser beam 412, for example by detecting reflected laser light 428. This stimulus response can be reported to the processor 416 through a communications line 436. Secondary ions 404 are collected by the secondary ion collector 30 and processed by the time-of-flight mass spectrometer 34. The processor 416 can control and share data with the primary ion beam generator 24 and the time-of-flight mass spectrometer 34 through suitable communications connections, which can be wired or wireless.

Figure 5:
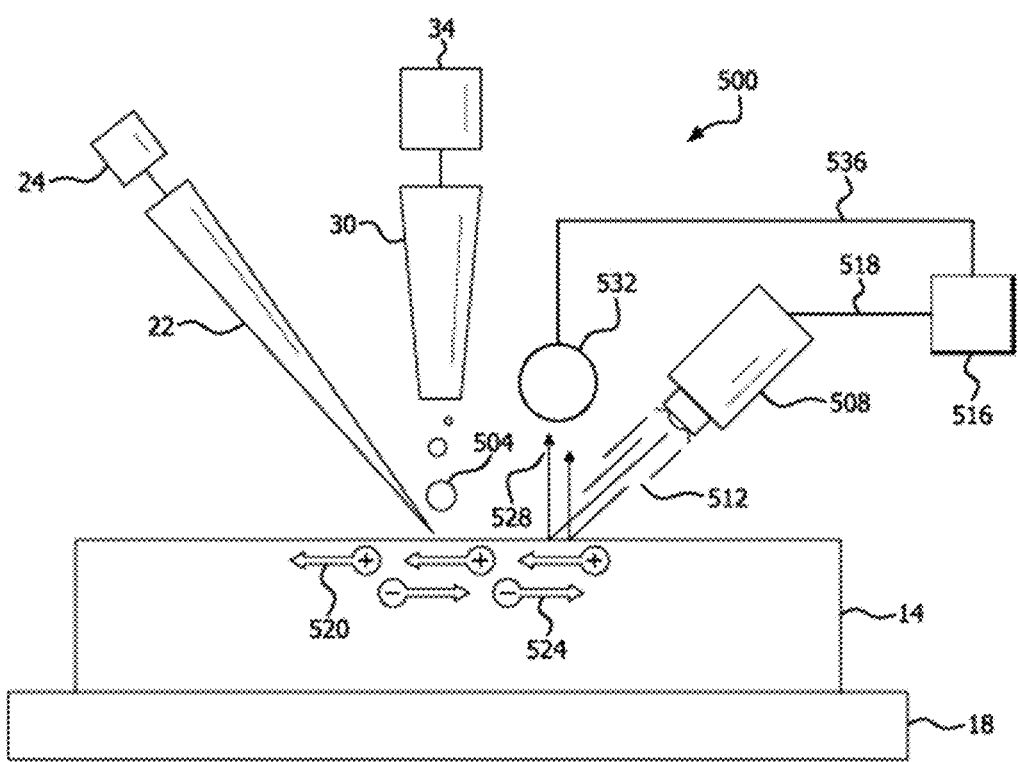
FIG. 5 is a schematic depiction of a secondary ion time-of-flight mass spectrometry system with broad spectrum white light ion migration stimulus.

The electromagnetic radiation can comprise broad spectrum white light. There is shown in FIG. 5, where like numbers refer to like elements, a secondary ion time-of-flight mass spectrometry system 500 with broad spectrum white light ion migration stimulus. A broad spectrum white light generator 508 is provided so as to direct a beam 512 of broad spectrum white light to the sample 14. The broad spectrum white light generator 508 can be controlled by a processor 516 through a communications line 518, which can be wired or wireless. The beam 512 of broad spectrum white light stimulates ion migration of positive ions 520 and/or negative ions 524 in the sample 14. A sensor 532 can be provided to sense the response of the sample 14 to the beam 512 of broad spectrum white light, for example by detecting reflected portions 528 of the broad spectrum white light. This stimulus response can be reported to the processor 516 through a communications line 536. Secondary ions 504 are collected by the secondary ion collector 30 and processed by the time-of-flight mass spectrometer 34. The processor 516 can control and share data with the primary ion beam generator 24 and the time-of-flight mass spectrometer 34 through suitable communications connections, which can be wired or wireless.

Figure 6:
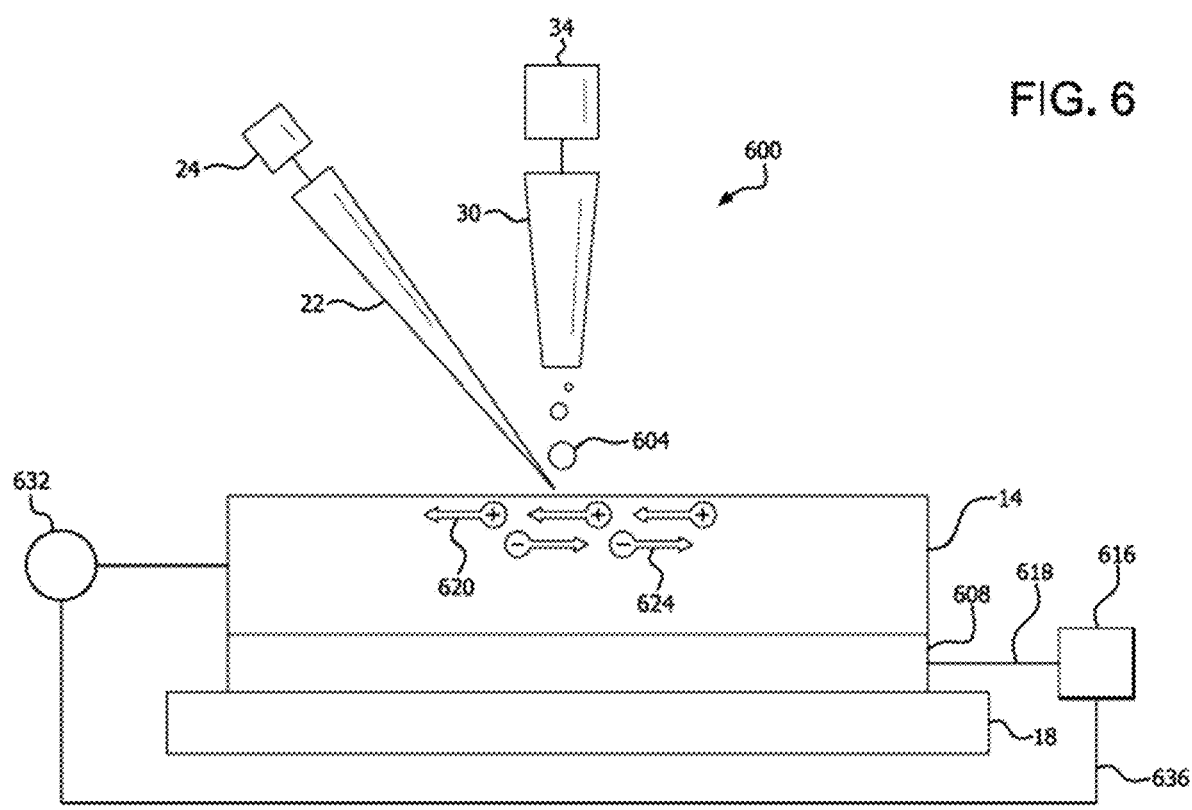
FIG. 6 is a schematic depiction of a secondary ion time-of-flight mass spectrometry system with a heating and temperature change ion migration stimulus.

The stimulation of the ions within the sample can comprise changing the temperature of the sample. There is shown in FIG. 6, where like numbers refer to like elements, a secondary ion time-of-flight mass spectrometry system 600 with an heating and temperature change ion migration stimulus. A heat source 608 is provided so as to heat the sample 14. The heat source 608 can be controlled by a processor 616 through a communications line 618, which can be wired or wireless. The temperature change in the sample 14 caused by the heat source 608 stimulates ion migration of positive ions 620 and/or negative ions 624 in the sample 14. A sensor 632 can be provided to sense the response of the sample 14 to the temperature change from the heat source 608, for example by detecting temperature and/or rate of change of temperature. This stimulus response can be reported to the processor 616 through a communications line 636. Secondary ions 604 are collected by the secondary ion collector 30 and processed by the time-of-flight mass spectrometer 34. The processor 616 can control and share data with the primary ion beam generator 24 and the time-of-flight mass spectrometer 34 through suitable communications connections, which can be wired or wireless.

Figure 7:
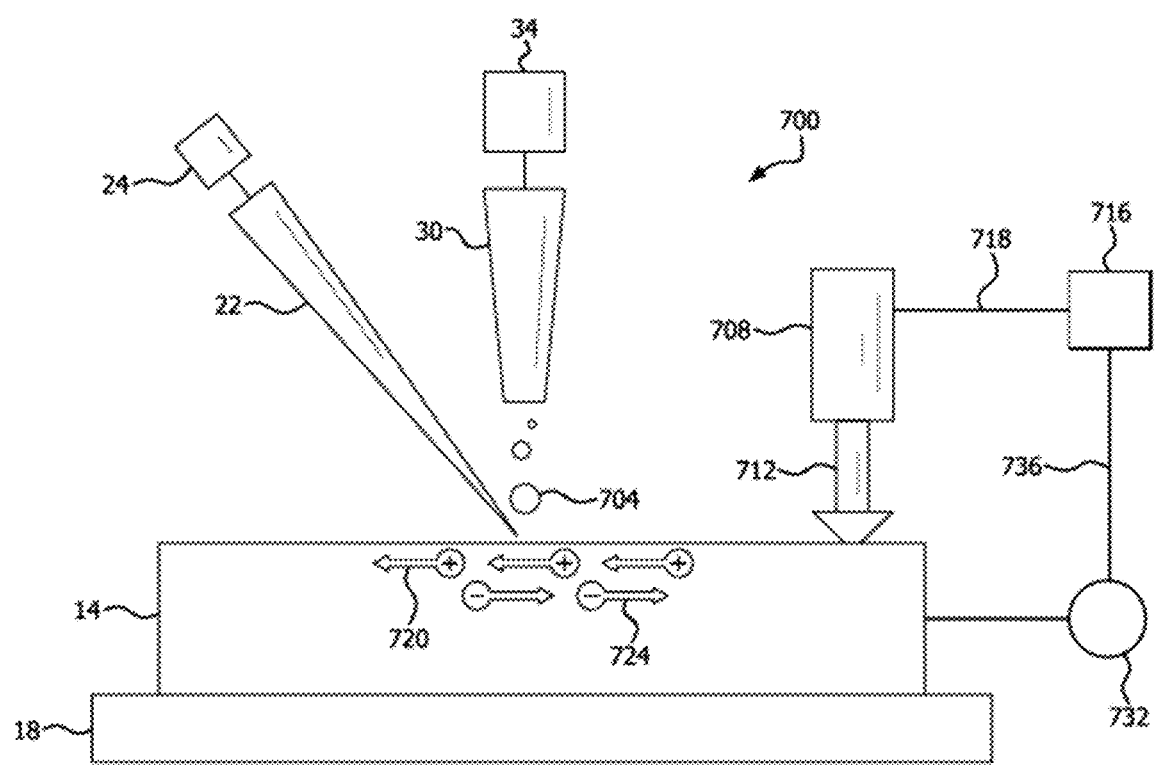
FIG. 7 is a schematic depiction of a secondary ion time-of-flight mass spectrometry system with an applied force ion migration stimulus.

The stimulation of the ions within the sample can comprise the application of mechanical force to the sample. There is shown in FIG. 7, where like numbers refer to like elements, a secondary ion time-of-flight mass spectrometry system 700 with an applied mechanical force ion migration stimulus. A mechanical force generator 708 can be provided so as to direct a mechanical force 712 to the sample 14. The mechanical force generator 708 can be controlled by a processor 716 through a communications line 718, which can be wired or wireless. The mechanical force 712 stimulates ion migration of positive ions 720 and/or negative ions 724 in the sample 14. A sensor 732 can be provided to sense the response of the sample 14 to the mechanical force 712, for example by detecting the deflection of the sample 14. This stimulus response can be reported to the processor 716 through a communications line 736. Secondary ions 704 collected by the secondary ion collector 30 and processed by the time-of-flight mass spectrometer 34. The processor 716 can control and share data with the primary ion beam generator 24 and the time-of-flight mass spectrometer 34 through suitable communications connections which can be wired or wireless.

Figure 8:
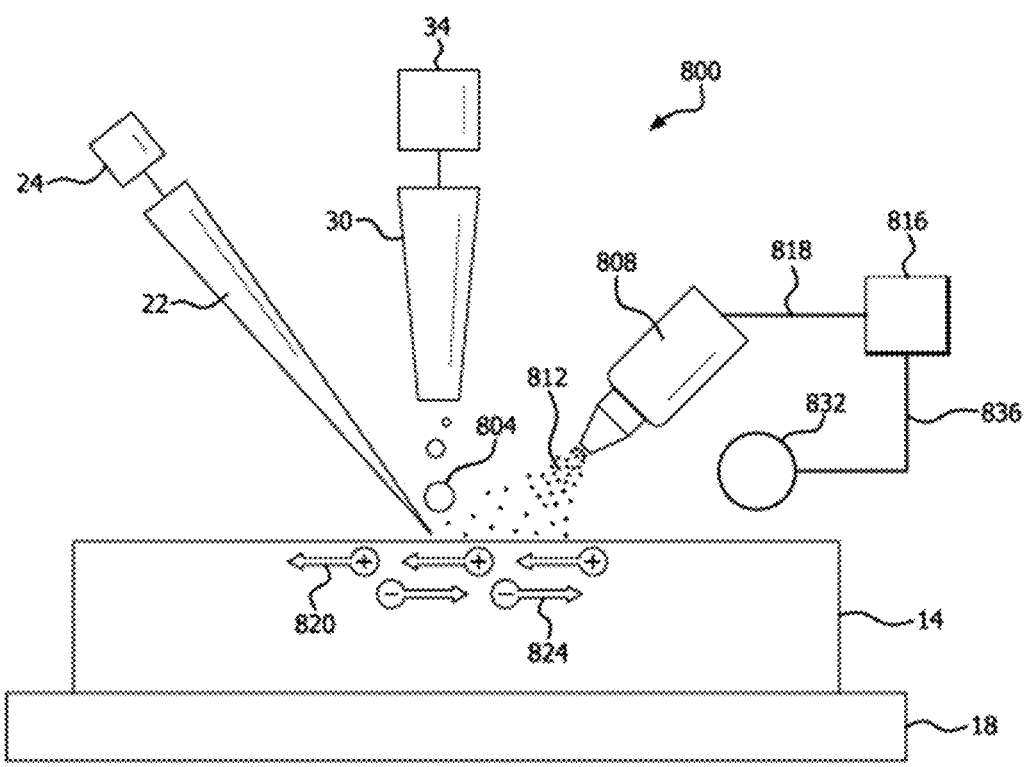
FIG. 8 is a schematic depiction of a secondary ion time-of-flight mass spectrometry system with chemical species ion migration stimulus.

The stimulation of the ions within the sample can comprise the application to the sample of a chemical species that causes ion migration within the sample. There is shown in FIG. 8, where like numbers refer to like elements, a secondary ion time-of-flight mass spectrometry system 800 with a chemical species ion migration stimulus. A chemical species source 808 can be provided so as to direct a chemical species 812 to the sample 14. The chemical species source 808 can be controlled by a processor 816 through a communications line 818, which can be wired or wireless. The chemical species 812 stimulates ion migration of positive ions 820 and/or negative ions 824 in the sample 14. A sensor 832 can be provided to sense the response of the sample 14 to the chemical species 812, for example by the concentration or consumption of the chemical species at the sample 14. This stimulus response can be reported to the processor 816 through a communications line 836. Secondary ions 804 are collected by the secondary ion collector 30 and processed by the time-of-flight mass spectrometer 34. The processor 816 can control and share data with the primary ion beam generator 24 and the time-of-flight mass spectrometer 34 through suitable communications connections which can be wired or wireless.

EXAMPLE

The time-resolved ToF-SIMS mode can be built on commercial ToF-SIMS instrument and additional external electronics. In this mode, continuous scanning by the primary ion beam across specified region (10×10 μm-500×500 μm) is synchronized with application of the external stimuli such as electric field, light, temperature or mechanical stress. The collected data can contain information about time evolution of chemical properties in the scanned 2D region. Data is collected using instrument software Surface Lab, ION.TOF Gmb (Munster, Germany) and further processed using custom Python scripts to extract time evolution. The collected data can be reshaped in 4D (x-, y-spatial coordinates, time, ion mass), 3D (spatial coordinate, time, ion mass), or 2D (time, ion mass).

External analog input/output electronics controlled by a National Instruments PXI controller was used to apply electric bias (up to ±100V) between electrodes sputtered on surface of the studied sample. The same electronics can be also used to measure electric response (e.g. electric current) of the studied system. ToF-SIMS measurements were carried out across the area in between the electrodes, which allowed the control of ionic motion and electro-chemical reactions associated with the applied electric field. The time resolution of the measurements is defined by ToF-SIMS scanning speed and can vary from ~100 ms to seconds. This configuration can be also complemented by illumination of external light using LED light of the instrument of custom laser irradiation sources of various wavelengths, illuminated though the ToF-SIMS window. Additionally, the temperature of the sample can be changed using bottom heater/cooling stage of the ToF-SIMS instrument. Altogether, this configuration allows the study of the time evolution of the chemical and electrical properties of the sample in an external electric field, light illumination and changing temperature.

This mode was used for the investigation of the ionic dynamic in the range of hybrid organic inorganic photovoltaic (HOIP) perovskites. Those materials are considered as a prospective system for a new generation of solar cells with high efficiency. However, due to the presence of several mobile species in the composition their behavior is still poorly understood. Time-resolved ToF-SIMS allows direct study of the ionic dynamics in electric fields, which is important for fundamental investigations into the properties of these materials. The application of the electric field was performed using a sample holder with electrical feedthroughs, which were connected using isolated wires to pairs of metal electrodes sputtered on the surface of studied sample.

These measurements allowed the system to directly track the motion of organic species on the surface of HOIP. The distribution of $CH_3NH_3^+$ species as a function of applied electric bias and light illumination in between the electrodes was determined. Measurements were carried out using $Bi_3^+$ primary ion source with energy of ions of 30 keV, current~0.5 nA and spot size~120 nm. The primary ion source was rastered over 50×50 μm square region with 128×128 resolution. The total scan size was about 0.9 s. An $O_2^-$ sputter source with energy of 500 eV and current~75 nA was used to clean the surface of the studied sample before measurements, and cleaning was performed over 200×200 μm region for 5 s. The time-of-flight mass analyzer was operated in positive ion detection mode and provided mass resolution m/Δm=100-300. DC electrical bias up to ±10 V was applied in between Au electrodes sputtered on surface of the sample, and additionally broad band white LED light was used to illuminate surface of the studied sample.

Figure 9:
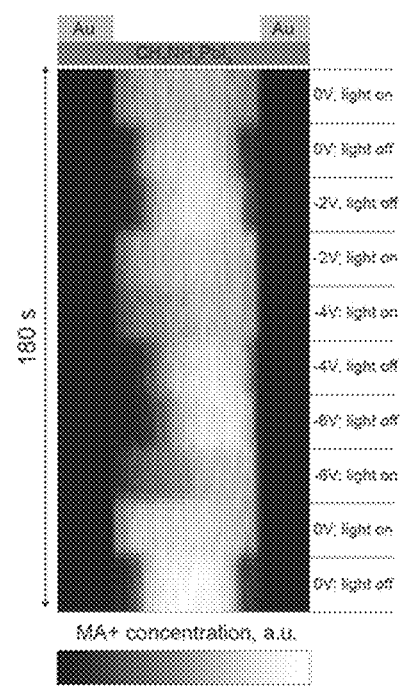
FIG. 9 is example of time-resolved ToF-SIMS application for investigation of ionic dynamics in photovoltaic perovskites, showing a map of $CH_3NH_3^+$ distribution in between gold electrodes as a function of spatial coordinate (X) and time (Y) with different bias and light illumination conditions, with $CH_3NH_3^+$ concentration is coded in grayscale. During the measurement external conditions (electric bias and light) are changed, as labeled on the right of map.
Figure 10:
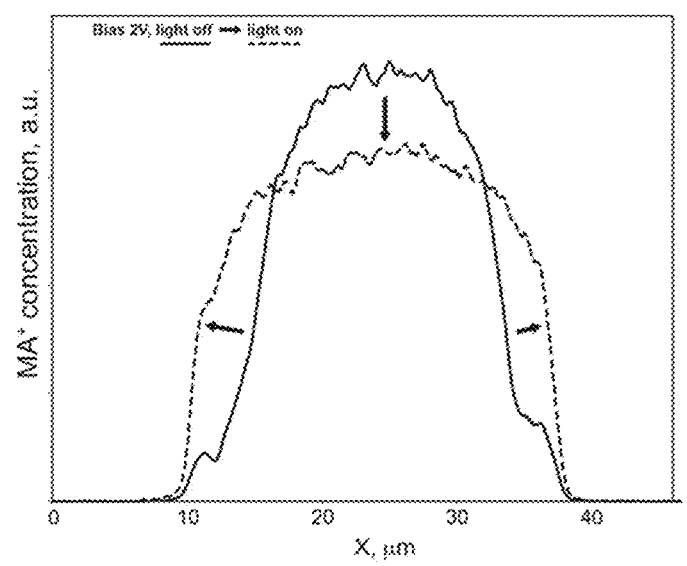
FIG. 10 is a plot of intensity (a.u.) versus distance (μm) showing $CH_3NH_3^+$ concentration profile changes after the switching of light illumination conditions.
Figure 11:
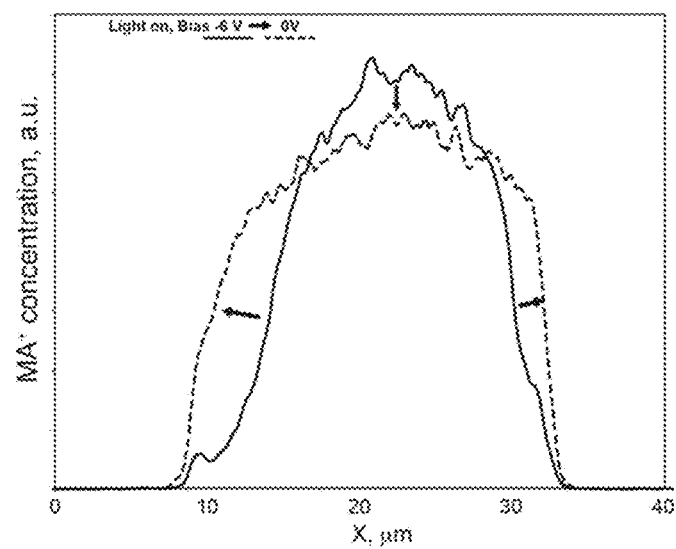
FIG. 11 is plot of intensity (a.u.) versus distance (μm) showing $CH_3NH_3^+$ concentration profile changes after the switching of electrical bias.

FIG. 9 is a map of $CH_3NH_3^+$ distribution in between of gold electrodes as a function of spatial coordinate (X) and time (Y) with different bias and light illumination conditions. In this map $CH_3NH_3^+$ concentration is coded in grayscale, while x-direction represents spatial coordinate across the sample gap between electrodes, y-direction represents time axis. During the measurement external conditions (electric bias and light) are changed, as labeled on the right of map. FIG. 10 shows $CH_3NH_3^+$ concentration profiles change after switching of light illumination conditions. FIG. 11 shows $CH_3NH_3^+$ concentration profiles change after switching of electrical bias. Detailed analysis of the $CH_3NH_3^+$ concentration profiles shows significant changes associated with both illumination (FIG. 10) and electric field (FIG. 11) change. Relaxation time of those processes is of order of seconds. Similar measurements were done to study the dynamics of $I^-$ ions. Acquired data shed light on the ionic mobility on the surface of HOIP during its application. In particularly, it showed that organic $CH_3NH_3^+$ can be mobile in the external electric field, while its mobility is significantly dependent on light illumination conditions. This phenomenon needs to considered for future application of the material as a potential base of a solar cell.

Figure 12:
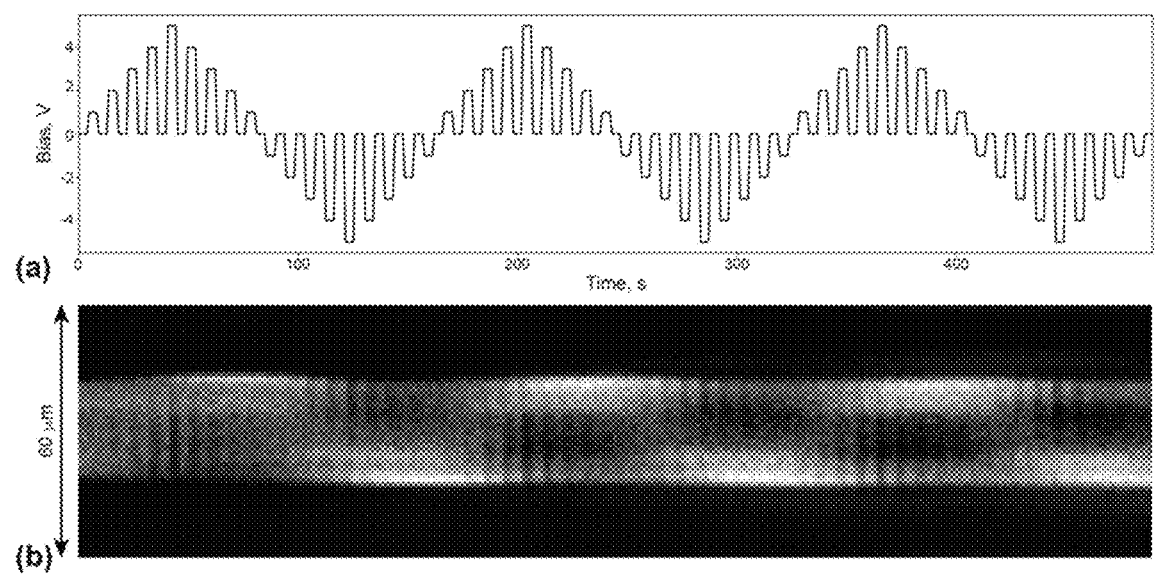
FIG. 12 shows the results of time-resolved ToF-SIMS measurements in HOIP.

To further understand the fundamentals of HOIP, ionic motion was studied in a gradually changing electric field by time-resolved ToF-SIMS. These measurements were performed using electrical waveforms commonly used to measure hysteresis loops in ferroelectrics (FIG. 12(a)). FIG. 12(a-b) shows the results of time-resolved ToF-SIMS measurements in HOIP from an applied electrical bias (FIG. 12(a)), and the time evolution map of HOIP decomposition ions (FIG. 12(b)). Full ionic data was acquired, which allowed parallel analysis of all ions detected by the ToF-SIMS. The analysis was performed using multivariate statistical methods, such as non-negative matrix factorization, which significantly simplifies interpretation of multidimensional datasets, which cannot be processed manually. This method allowed the identification of ionic species, which were actively moving during measurements, and those species were attributed to decomposition ions of base perovskite. Time evolution map of their behavior is presented in FIG. 12(b). This map shows a hysteretic type of behavior and is significant for understanding the material operation in in-operando conditions for future use in solar cells. Similar measurements were performed to study ionic motion in single crystal HOIP and showed the ionic contribution in the material electronic properties.

Figure 13A:
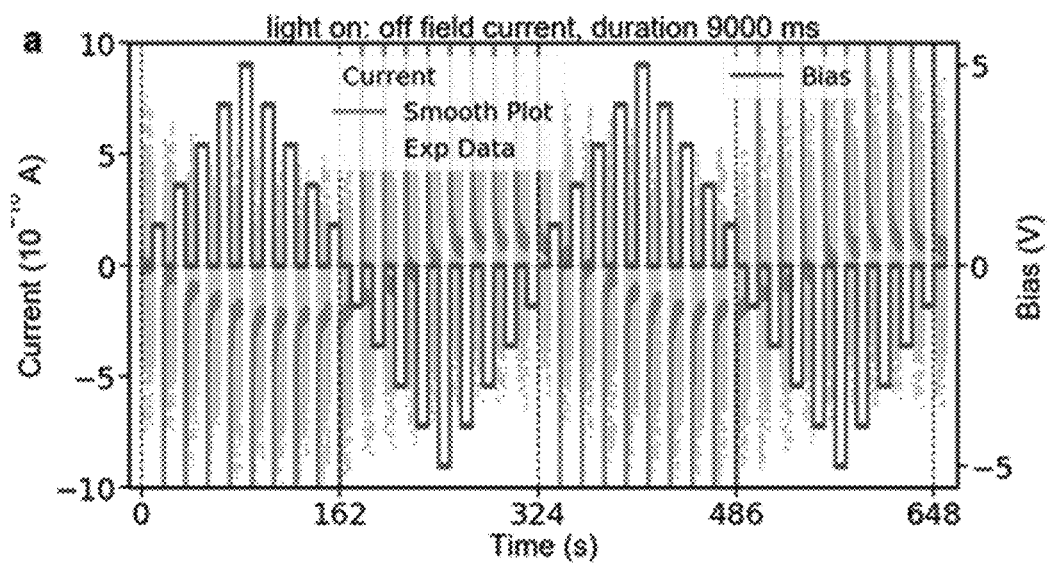
FIG. 13(a) is a plot of electric current and applied bias as a function of time.
Figure 13B:
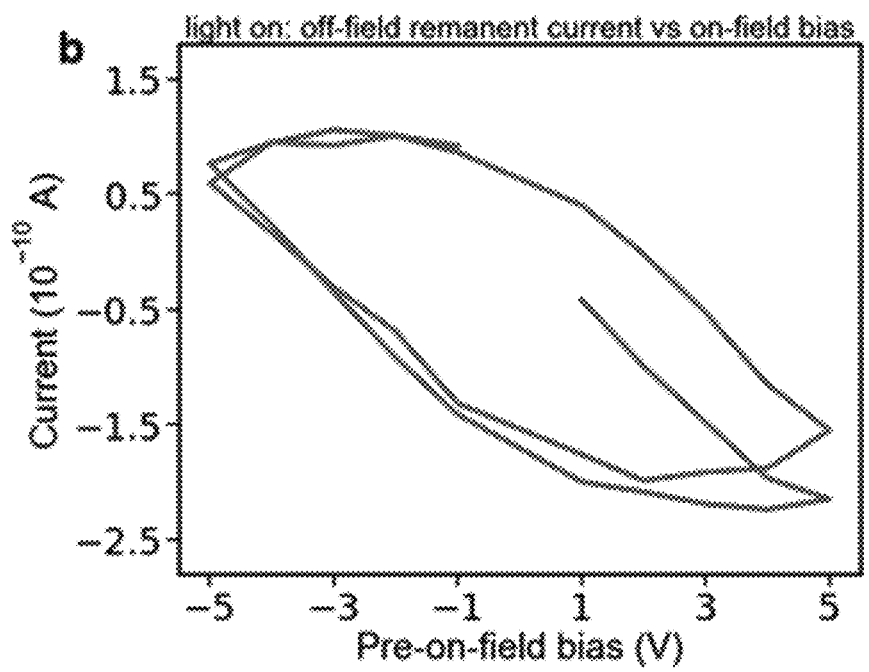
FIG. 13(b) is a current hysteresis loop.

The electrical response of the material can be tracked simultaneously with time-resolved ToF-SIMS measurements. This combination allows complementary characterization of both chemical (via ToF-SIMS) and physical (via macroscopic electrical response) phenomena. In particular, in the lateral electrode configuration combines both electronic and ionic contributions. FIG. 13 shows charge carrier transport between the lateral electrodes on the surface of HOIP thin film. FIG. 13(a) shows the electric current and applied bias plots as a function of time, and FIG. 13(b) shows the current hysteresis loop. The current between the lateral electrodes was measured during time-resolved ToF-SIMS measurements (FIG. 13(a)). This revealed long-term ionic relaxation with relaxation time above 200 s and corresponded hysteresis loop (FIG. 13(b)).

Figure 14C:
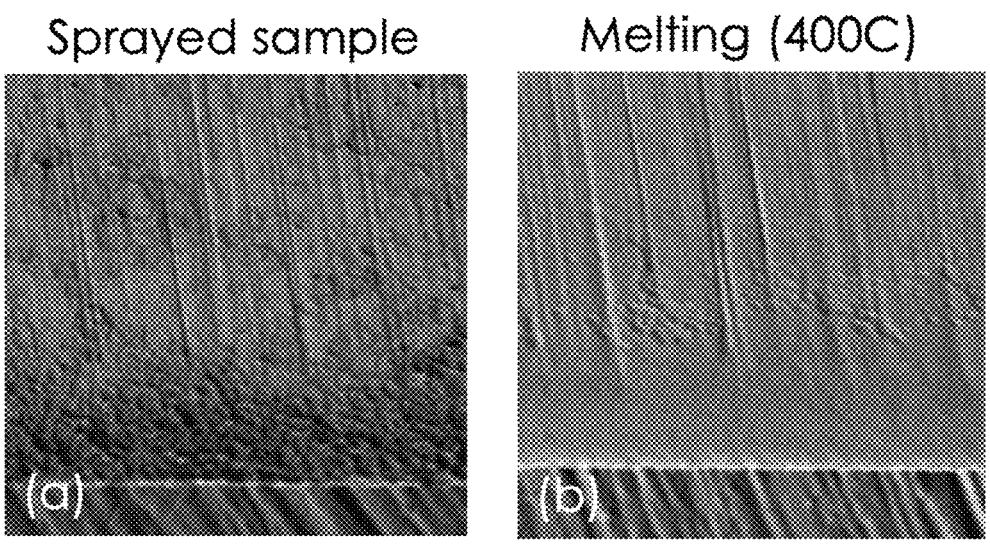
FIG. 14(c) shows morphological changes acquired using secondary electron signal for a crystallization sample at 100° C.
Figure 14C:
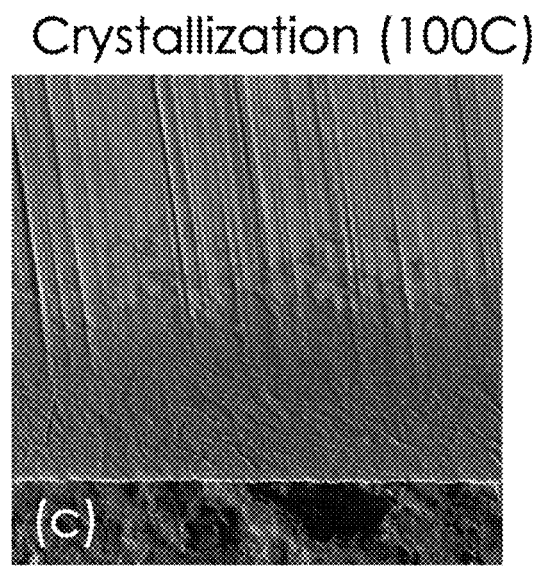
Figure 14D:
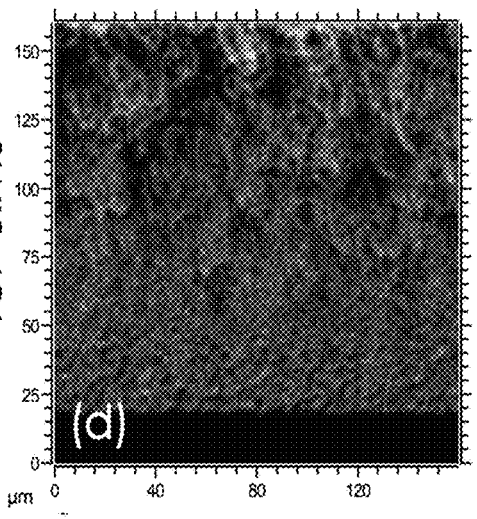
FIG. 14(d) shows the chemical changes measured using secondary ion signal (C+ concentration) for the sprayed sample.
Figure 14E:
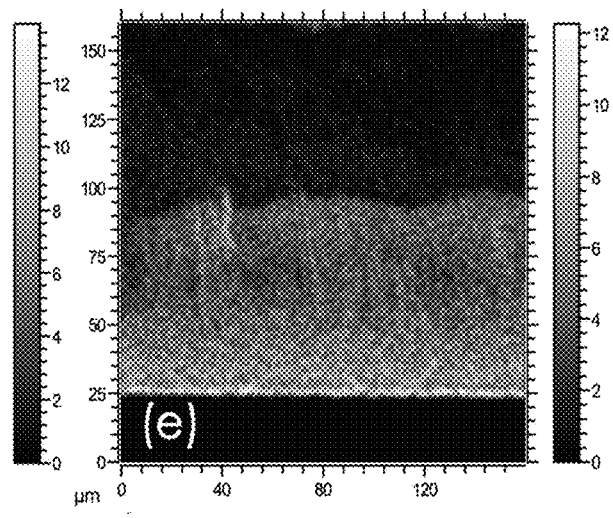
FIG. 14(e) shows the chemical changes measured using secondary ion signal (C+ concentration) for the melting sample at 400° C.
Figure 14F:
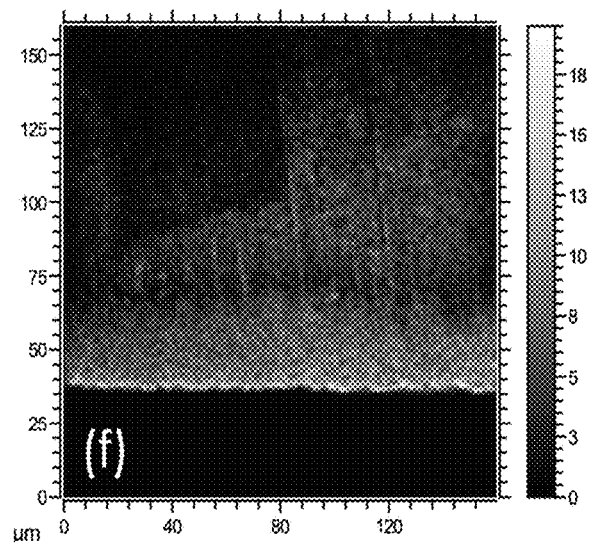
FIG. 14(f) shows the chemical changes measured using secondary ion signal (C+ concentration) for the crystallization sample at 100° C.

Similarly, time-resolved ToF-SIMS can be used to reveal chemical phenomena associated with temperature change. In this case, ToF-SIMS measurements were carried out during a change in the temperature of the sample. In particular, such measurements have been done to study chemical changes associated with melting and crystallization of polymer coating on metal plates. Measurements were carried out using $Bi_3^+$ primary ion source with energy of ions of 30 keV, current~0.5 nA and spot size~120 nm. The time-of-flight mass analyzer was operated in positive ion detection mode to analyze mass-to-charge ration of the secondary ions with mass resolution m/Δm=100-300. The study temperature of the sample was changed from room temperature (~25° C.) to 400° C. and back to room temperature. FIG. 14(a-f) shows the time-resolved ToF-SIMS investigations of polymer coating melting and crystallization, with FIGS. 14(a)-(c) showing morphological changes acquired using secondary electron signals, and FIGS. 14(d)-(f) showing chemical changes measured using secondary ion signal (C+ concentration). The morphology of the coating was controlled using secondary electron signal of the ToF-SIMS (FIG. 14(a)-(c)), while chemical changes controlled using a secondary ion ToF-SIMS signal (FIG. 14(d)-(f)). This permits the identification of chemical species redistribution on the metal surface after polymer coating melting (FIG. 14(b),(e)) and its crystallization (FIG. 14(c),(f)).

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A method of performing time-of-flight secondary ion mass spectrometry on a sample, comprising the steps of:
   directing a beam of primary ions to the sample;
   stimulating the migration of ions within the sample while the beam of primary ions is directed at the sample;
   cycling the stimulation of the ions between a higher ion migration stimulation state and a lower ion migration stimulation state;
   collecting secondary ions emitted from the sample by the beam of primary ions in a time-of-flight mass spectrometer; and,
   performing time-of-flight secondary ion mass spectrometry on the secondary ions.

2. The method of claim 1, wherein the stimulation of the ions within the sample comprises applying an electric field across the sample.

3. The method of claim 1, wherein the stimulation of the ions within the sample comprises changing the temperature of the sample.

4. The method of claim 1, wherein the stimulation of the ions within the sample comprises irradiating the sample with electromagnetic radiation.

5. The method of claim 4, wherein the electromagnetic radiation comprises a laser beam.

6. The method of claim 4, wherein the electromagnetic radiation comprises broad spectrum white light.

7. The method of claim 1, wherein the stimulation of the ions within the sample comprises the application of mechanical force to the sample.

8. The method of claim 1, wherein the stimulation of the ions within the sample comprises the application to the sample of a chemical species that causes ion migration within the sample.

9. The method of claim 1, further comprising the step of collecting stimulation response data.

10. The method of claim 1, wherein the beam of primary ions is moved across portions the sample.

11. The method of claim 1, wherein the position where the primary ion beam intercepts the sample is controlled by a processor.

12. The method of claim 11, wherein the processor stores position data comprising the position where the beam intercepts the sample.

13. The method of claim 12, wherein the processor stores time-of flight secondary ion mass spectrometry data and correlates such data with the primary ion beam position data.

14. The method of claim 13, wherein the processor stores the position data and the time-of-flight secondary ion mass spectrometry data as a function of time.

15. The method of claim 1, wherein the primary ions comprise at least one selected from the group consisting of Bi, Ar, Au, Ga and $C_{60}$.

16. The method of claim 1, wherein the sample comprises at least one selected from the group consisting of ferroelectrics, memristors, photovoltaics and catalytic materials.

\* \* \* \* \*